(12) United States Patent
Scafaria et al.

(10) Patent No.: US 11,784,960 B2
(45) Date of Patent: Oct. 10, 2023

(54) METHOD, APPARATUS, AND COMPUTER-READABLE MEDIUM FOR LEVERAGING CONNECTIONS

(71) Applicant: DotAlign, Inc., New York, NY (US)

(72) Inventors: Vince Scafaria, Colts Neck, NJ (US); Jaspreet Bakshi, New York, NY (US); Kenneth Dreyer, Chester, NJ (US); Joshua Quintus, Ridgewood, NY (US)

(73) Assignee: DotAlign, Inc., New York, NY (US)

( * ) Notice: Subject to any disclaimer, the term of this patent is extended or adjusted under 35 U.S.C. 154(b) by 0 days.

(21) Appl. No.: 16/263,097

(22) Filed: Jan. 31, 2019

(65) Prior Publication Data

US 2019/0238492 A1    Aug. 1, 2019

Related U.S. Application Data

(60) Provisional application No. 62/624,502, filed on Jan. 31, 2018.

(51) Int. Cl.
*H04L 51/52* (2022.01)
*H04L 51/04* (2022.01)
*H04L 67/306* (2022.01)
*G06Q 50/00* (2012.01)
*G06F 40/186* (2020.01)

(52) U.S. Cl.
CPC ............ *H04L 51/52* (2022.05); *G06Q 50/01* (2013.01); *H04L 51/04* (2013.01); *H04L 67/306* (2013.01); *G06F 40/186* (2020.01)

(58) Field of Classification Search
CPC ..................................................... H04L 51/32
See application file for complete search history.

(56) References Cited

U.S. PATENT DOCUMENTS

| | | | | |
|---|---|---|---|---|
| 7,069,308 | B2 * | 6/2006 | Abrams | G06Q 10/10 705/319 |
| 7,885,901 | B2 * | 2/2011 | Hull | H04L 51/32 705/319 |
| 8,407,311 | B1 * | 3/2013 | Behforooz | H04L 51/04 709/217 |
| 2008/0256170 | A1 | 10/2008 | Hayashi et al. | |
| 2009/0271370 | A1 * | 10/2009 | Jagadish | H04L 51/02 |
| 2009/0319466 | A1 * | 12/2009 | Liu | G06F 16/24575 706/54 |

(Continued)

OTHER PUBLICATIONS

U.S. Patent and Trademark Office (ISA/US), International Search Report and Written Opinion of the ISA in International Patent Application No. PCT/US2019/015953, dated Apr. 26, 2019.

*Primary Examiner* — Esther B. Henderson
(74) *Attorney, Agent, or Firm* — Timothy W. Menasco, Esq.; Harter Secrest & Emery LLP

(57) ABSTRACT

Embodiments of the present disclosure provide a method, apparatus, and computer-readable medium for leveraging connections. One embodiment is a method that includes determining, by a processor, a plurality of subset lists of leads from a list of leads, and creating, by the processor, a message for each one of the plurality of subset lists of leads to one of a plurality of collaborators. The method further includes transmitting, by the processor, each message with one of the plurality of subset lists of leads to each of the plurality of collaborators from a user.

12 Claims, 9 Drawing Sheets

---

702: (a) determining, by a processor, a plurality of subset lists of leads from a list of leads; (b) creating, by the processor, a message for each one of the plurality of subset lists of leads to one of a plurality of collaborators; and (c) transmitting, by the processor, each message with one of the plurality of subset lists of leads to each of the plurality of collaborators from a user.

704: the method further comprising creating, by one of the plurality of collaborators, a second message to each one of the leads in the subset list of leads.

706: the method further comprising transmitting, by one of the plurality of collaborators, the second message to each one of the leads in the subset list of leads.

708: wherein the message is at least one of an email, text message, sms message, social media message, and instant message.

710: wherein the second message is at least one of an email, text message, sms message, social media message, and instant message.

712: wherein the message is a request for an introduction to the user by one of the plurality of collaborators to one of the plurality of leads.

714: wherein the plurality of subset lists of leads is based on determining a correspondence between the list of leads and the plurality of collaborators.

716: wherein the correspondence is based on at least (i) recency of communication, (ii) length of relationship, (iii) strength of relationship, (iv) the collaborator knowing the lead, (v) seniority, and (vi) amount of communication.

(56) References Cited

U.S. PATENT DOCUMENTS

| | | | |
|---|---|---|---|
| 2011/0288962 A1* | 11/2011 | Rankin, Jr. | G06Q 30/02 |
| | | | 705/27.1 |
| 2011/0289153 A1 | 11/2011 | Hull et al. | |
| 2013/0318180 A1* | 11/2013 | Amin | G06Q 30/0253 |
| | | | 709/206 |
| 2014/0089400 A1* | 3/2014 | Yan | G06Q 30/0269 |
| | | | 709/204 |
| 2014/0143166 A1* | 5/2014 | Cheng | G06Q 10/1053 |
| | | | 705/319 |
| 2014/0279066 A1* | 9/2014 | Louis | H04L 67/535 |
| | | | 715/753 |
| 2014/0317126 A1 | 10/2014 | Work et al. | |
| 2015/0112880 A1* | 4/2015 | Blaylock, IV | H04L 63/102 |
| | | | 726/4 |
| 2015/0278221 A1 | 10/2015 | Perry, III | |
| 2016/0239535 A1* | 8/2016 | Hudack | G06F 16/9535 |

* cited by examiner

902: (a) analyzing, by a processor, a plurality of collaborators of a user and a plurality of leads; (b) determining, by the processor, a correspondence between (i) each one of the plurality of collaborators, and (ii) the plurality of leads; (c) transmitting, by the processor, messages to the plurality of collaborators; and (d) creating, by the processor, a second message to each one of the subset of the plurality of leads from one of the plurality of collaborators.

904: wherein the plurality of leads is one of a list and a spreadsheet of individuals.

906: wherein the correspondence is based on at least (i) recency of communication, (ii) length of relationship, (iii) strength of relationship, (iv) seniority, and (v) amount of communication.

908: wherein the correspondence is based on the collaborator knowing the lead.

910: wherein the second message is at least one of an email, text message, sms message, social media message, and instant message.

912: wherein the message is a request for an introduction to the user by one of the plurality of collaborators to one of the plurality of leads.

914: wherein the user is one of the plurality of collaborators.

FIG. 9

METHOD, APPARATUS, AND COMPUTER-READABLE MEDIUM FOR LEVERAGING CONNECTIONS

BACKGROUND OF THE DISCLOSURE

Field of the Disclosure

Exemplary embodiments of the present disclosure relate to a method, apparatus, and computer-readable medium for connections. Exemplary embodiments of the present disclosure relate more particularly to second degree connections.

Description of Related Art

Social network applications provide a user with the ability to create vast networks of personal and business connections. However, there is a need for the ability to leverage the connections of a user's connections to make a user's connections more useful.

BRIEF SUMMARY OF THE DISCLOSURE

In view of the foregoing, it is an object of the present disclosure to provide a method, apparatus, and computer-readable medium of leveraging connections.

A first exemplary embodiment of the present disclosure provides a method of leveraging connections. The method includes determining, by a processor, a plurality of subset lists of leads from a list of leads, and creating, by the processor, a message for each one of the plurality of subset lists of leads to one of a plurality of collaborators. The method further includes transmitting, by the processor, each message with one of the plurality of subset lists of leads to each of the plurality of collaborators from a user.

A second exemplary embodiment of the present disclosure provides an apparatus for leveraging connections. The apparatus includes at least one processor and a memory storing computer program instructions executable by the at least one processor, wherein the memory with the computer program instructions and the at least one processor are configured to cause the apparatus to at least determine a plurality of subset lists of leads from a list of leads, and create a message for each one of the plurality of subset lists of leads to one of a plurality of collaborators. The at least one processor and memory storing computer program instructions are further configured to cause the apparatus to transmit each message with one of the plurality of subset lists of leads to each of the plurality of collaborators from a user.

A third exemplary embodiment of the present disclosure provides a computer-readable medium tangibly storing computer program instructions which when executed by a processor, cause the processor to at least determine a plurality of subset lists of leads from a list of leads, and create a message for each one of the plurality of subset lists of leads to one of a plurality of collaborators. The computer-readable medium tangibly storing computer program instructions with the processor further cause the processor to transmit each message with one of the plurality of subset lists of leads to each of the plurality of collaborators from a user.

A fourth exemplary embodiment of the present disclosure provides a method of leveraging connections. The method includes analyzing, by a processor, a plurality of collaborators of a user and a plurality of leads, and determining, by the processor, a correspondence between (i) each one of the plurality of collaborators, and (ii) the plurality of leads, wherein the user is one of the plurality of collaborators. The method further includes transmitting, by the processor, messages to the plurality of collaborators, and creating, by the processor, a message to each one of the subset of the plurality of leads from one of the plurality of collaborators.

A fifth exemplary embodiment of the present disclosure provides an apparatus of leveraging connections. The apparatus includes at least one processor and a memory storing computer program instructions executable by the at least one processor, wherein the memory with the computer program instructions and the at least one processor are configured to cause the apparatus to at least analyze a plurality of collaborators of a user and a plurality of leads, and determine a correspondence between (i) each one of the plurality of collaborators, and (ii) the plurality of leads, wherein the user is one of the plurality of collaborators. The at least one processor and memory storing computer program instructions are further configured to cause the apparatus to transmit messages to the plurality of collaborators, and create a message to each one of the subset of the plurality of leads from one of the plurality of collaborators.

A sixth exemplary embodiment of the present disclosure provides a computer-readable medium tangibly storing computer program instructions which when executed by a processor, causes the processor to at least analyze a plurality of collaborators of a user and a plurality of leads, and determine a correspondence between (i) each one of the plurality of collaborators, and (ii) the plurality of leads, wherein the user is one of the plurality of collaborators. The computer-readable medium tangibly storing computer program instructions with the processor further cause the processor to further transmit messages to the plurality of collaborators, and create a message to each one of the subset of the plurality of leads from one of the plurality of collaborators.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

FIG. 9 is an exemplary logic flow diagram suitable for performing embodiments of the present disclosure.

DETAILED DESCRIPTION OF THE DISCLOSURE

Figure 1:
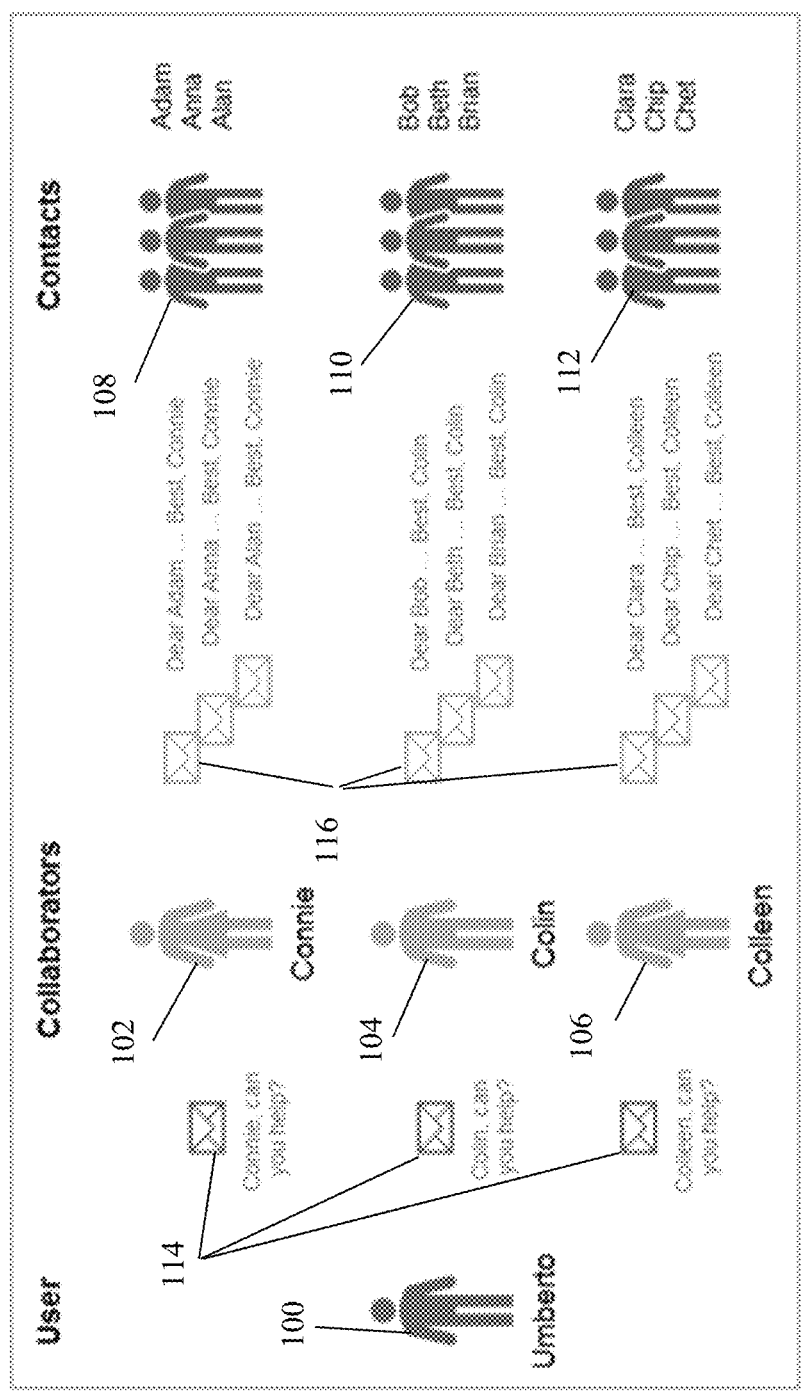
FIG. 1 is an exemplary embodiment of a process suitable for performing embodiments of the present disclosure.

There are limited options for a user to contact or message individuals, companies, organizations or parties that he/she does not currently know directly. In other words, there are few options for a user to contact the connections of his/her connections. One option is for a user to send a message to each of his/her connections requesting that each connection send a corresponding message to each of their connections. Another option would be for a user to perform a mail merge and message each of the user's connections. Each of the user's connections would then type a message to each of their contacts. Both options are time consuming and inefficient. Accordingly, there is a need for a better means to efficiently and effectively leverage the connections of a user's connections.

Embodiments of the present disclosure provide a method, apparatus and computer-readable medium for leveraging connections. Embodiments provide that a user can leverage the user's direct connections (also referred to as $1^{st}$ degree connections) of the user to obtain introductions to the connections of the user's 1st degree connections (also referred to as $2^{nd}$ degree connections). In other words, embodiments of the present disclosure provide a method, apparatus, and computer-readable medium for obtaining introductions to a user's $2^{nd}$ degree connections. Exemplary embodiments of connections include individuals, businesses, companies, organizations, persons, social networks, collaborators, or business connections. Embodiments also provide that a user can leverage his or her $1^{st}$ degree connections to send messages or leads. It should be appreciated that embodiments provide a means for a user to contact, message or meet other users that are not personally known to the user. It should be appreciated that $1^{st}$ degree connections refer to a connections that a user knows directly, and that $2^{nd}$ degree connections refer to connections of a user's $1^{st}$ degree connections, which the user does not know or does not know as well. In this regard, there will not be any overlap between a user's $1^{st}$ degree connections and a user's $2^{nd}$ degree connections. In other words, no connection for a particular user will be both a $1^{st}$ degree connection and a $2^{nd}$ degree connection.

In an embodiment, a user can take a list of leads and then send subset lists of the list of leads (e.g., a list of 2nd degree connections) to the user's $1^{st}$ degree connections (also referred to as collaborators) with a message. In one embodiment, the message is a request addressed to the $1^{st}$ degree connections requesting an introduction to the individuals on the subset list of leads (e.g., $2^{nd}$ degree connections known to that particular $1^{st}$ degree connection who received the request). In another embodiment, the message is a request addressed to the user's $1^{st}$ degree connection for an introduction with a partially ghost written message from the $1^{st}$ degree connection to the lead (or $2^{nd}$ degree connection) making an introduction to the user. An exemplary ghost written message is a message written by the user as if it were written from the $1^{st}$ degree connection of the user to the $2^{nd}$ degree connection. Embodiments further provide that the user's $1^{st}$ degree connections who receive a subset list of leads from the user are operable to then automatically send messages to each one of the leads on the subset list of leads. In other words, embodiments of the present disclosure allow a user to send a message to the user's $1^{st}$ degree connections with a list of $2^{nd}$ degree connections that allows the $1^{st}$ degree connections to automatically (with an option to decline in some embodiments) send messages to each one of the $2^{nd}$ degree connections.

Referring to FIG. 1, shown is an exemplary embodiment of the present disclosure. Shown in FIG. 1 is user Umberto 100 who desires to have messages sent to contacts 108, 110, 112 (Adam, Anna, Alan, Bob, Beth, Brian, Clara, Chip and Chet). Embodiments of messages include an email, text message, sms message, social media message (e.g., messages through Facebook, LinkedIn, Twitter, etc.), and instant message. However, user Umberto 100 may not know or have a close relationship to the contacts 108, 110, 112. In other words, user Umberto 100 may not be the best person with the closest personal relationship to the send the desired message to the contacts 108, 110, 112. Yet, user Umberto's 100 $1^{st}$ degree connections 102, 104, 106 or collaborators (e.g., people or individuals that user Umberto does know directly or has a relationship with) Connie, Colin, and Colleen do know or have a closer relationship with the contacts 108, 110, 112. Embodiments of the present disclosure allow user Umberto 100 to use a server or user equipment to ask (e.g., send a message request, email, text, social networking message) $1^{st}$ degree connections 102, 104, 106 or collaborators (Connie, Colin, Colleen) for an introduction (shown as a message 114 from user Umberto 100 to $1^{st}$ degree connections 102, 104, 106) to user Umberto's 100 $2^{nd}$ degree connections 108, 110, 112. Embodiments also allow user Umberto 100 to send a message 114 to the $1^{st}$ degree connections 102, 104, 106 (Connie, Colin, and Colleen through their user equipments) with a message 116 that can be sent directly to user Umberto's 100 $2^{nd}$ degree connections 108, 110, 112 (in this instance, Adam, Anna, Alan, Bob, Beth, Brian, Calar, Chip and Chet).

Figure 2:
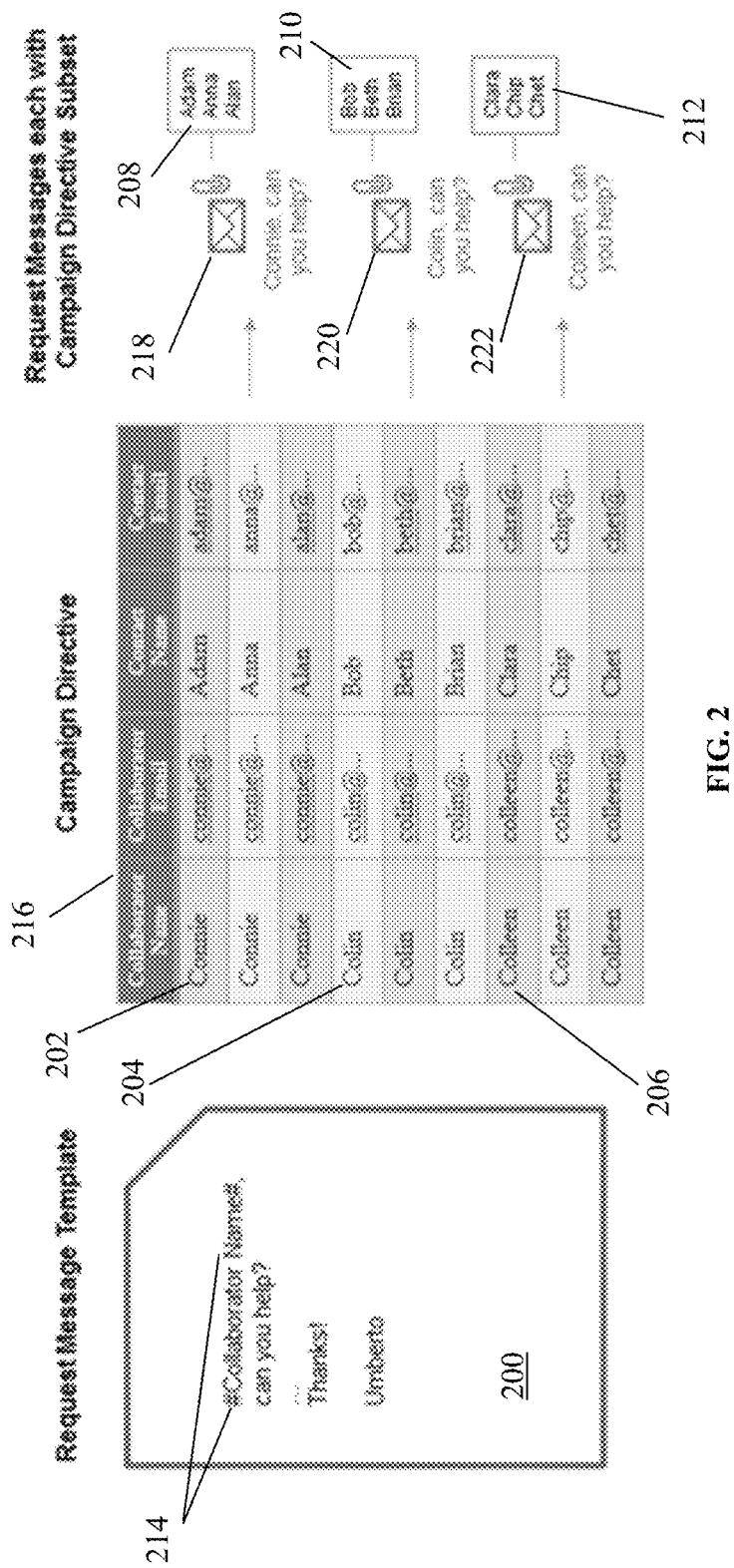
FIG. 2 is an exemplary embodiment of a portion of a process suitable for performing embodiments of the present disclosure.

Referring to FIG. 2, shown is an exemplary process for performing embodiments of the present disclosure as illustrated in FIG. 1. Shown in FIG. 2, is a campaign directive. The campaign directive, indicates which collaborator or $1^{st}$ degree connection of a user should send a message to which particular lead or contact on a given list of contacts. In this instance, the user may not know or have the strongest relationship with a particular lead or contact. Accordingly, the process set forth in FIG. 2 allows a user to have the user's $1^{st}$ degree connections who do know or have a correspondence or a strong relationship with a particular lead or contact be the individual that reaches out to that contact. The correspondence can be based on analyzing (e.g., by a processor, device, user equipment, server, system, etc.) recency of communication with the $2^{nd}$ degree connection, length of relationship with the $2^{nd}$ degree connection, seniority of the $2^{nd}$ degree connection and/or amount of communication between the $1^{st}$ degree connection and the $2^{nd}$ degree connection. In another embodiment the correspondence is based on the $1^{st}$ degree connection knowing the $2^{nd}$ degree connection.

The exemplary process shown in FIG. 2 begins with the user drafting a request message template 200. The request message template 200 is a message from the user to each collaborator 202, 204, 206, etc. or $1^{st}$ degree connection of the user. In one embodiment, the request message 200 is a request for an introduction to one or more contacts 208, 210, 212 known by the specific collaborator 202, 204, 206. In another embodiment, the request message 200 is a message with reference fields 214 from the campaign directive 216 such that certain elements of the campaign directive 216 (e.g., name of collaborator or name of contact) can auto-populate the request message 200. Each collaborator 202, 204, 206 will receive a personalized request message 218, 220, 222 from the user based on the request message template 200 which will include a link, document, spreadsheet, list, or campaign directive 200 subset with the contacts or $2^{nd}$ degree connections of the user to which the user wants to be introduced or wants messages sent to.

Figure 3:
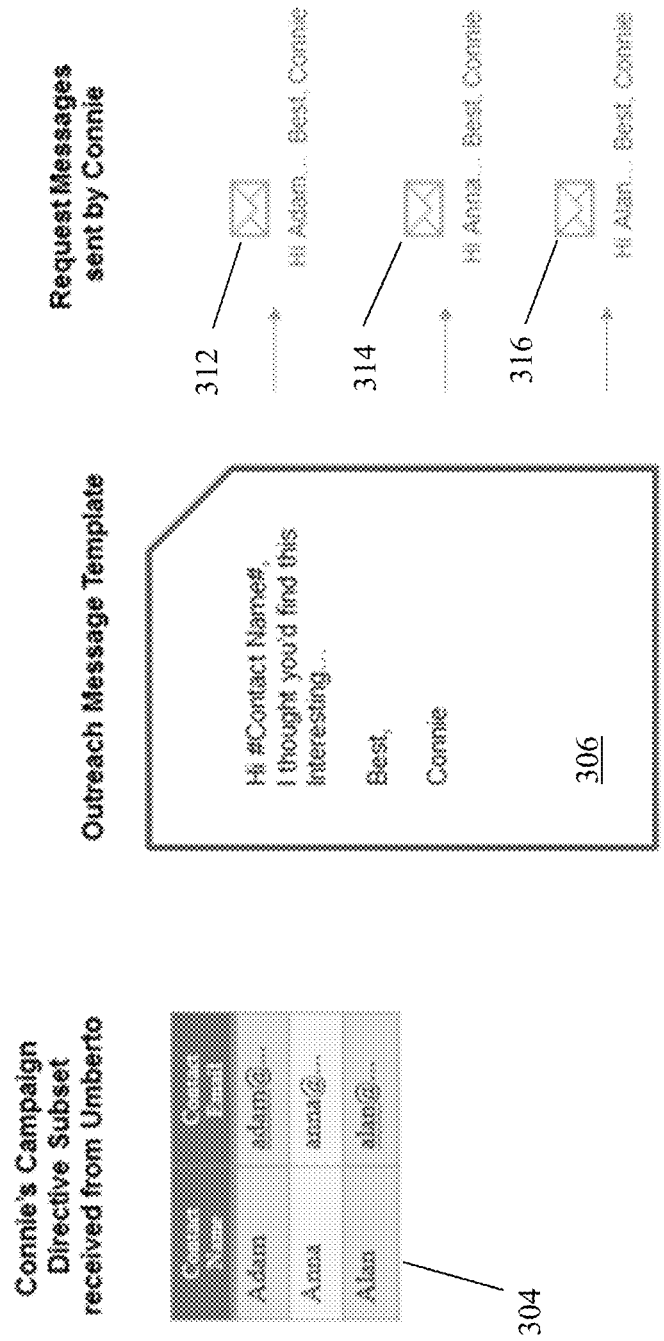
FIG. 3 is an exemplary aspect of a process suitable for performing embodiments of the present disclosure.

Next at FIG. 3, each collaborator 202, 204, 206 or $1^{st}$ degree connection of the user uses an outreach message template 302 that references fields from the campaign directive subset 304 received by that specific collaborator. A different specific outreach message 302 will be generated for each contact 208, 210, 212 referenced in the campaign directive subset 304 received by the collaborator 202, 204, 206. As such, each contact 208, 210, 212 will be sent and will receive from a collaborator 202, 204, or 206 (not the user) a message 312, 314, 316. Embodiments of the message can include an introduction by the collaborator 202, 204, 206 to the user 100. Embodiments of the message can also include information that the user 100 desires to be sent to the contact 208, 210, 212 by the collaborator 202, 204, 206. As shown in FIG. 3, user Umberto 100 sends a personalized request message to $1^{st}$ degree connection Connie with a campaign subset 304 and the outreach message template 302. $1^{st}$ degree connection Connie uses the outreach message template 306 with the campaign directive subset 304 to send out personalized messages 312, 314, 316 directly to those contacts listed in the campaign directive subset 304. As shown in FIG. 3, outreach message template 306 can include a ghost written message with items that can be substituted for information from the campaign directive subset 304. For instance, outreach message template 306 include the term "#Contact Name #", which can be an indication that the term should be replaced with the name of $2^{nd}$ degree connection that Connie is going to send the message to. This replacement of terms in the outreach message template 304 for items from the campaign directive subset 304 can occur automatically in response to a collaborator's input indicating they agree to send out the messages 312, 314, 316. Next $1^{st}$ degree connection Connie sends the messages 312, 314, 316 directly to contacts 208.

Figure 4:
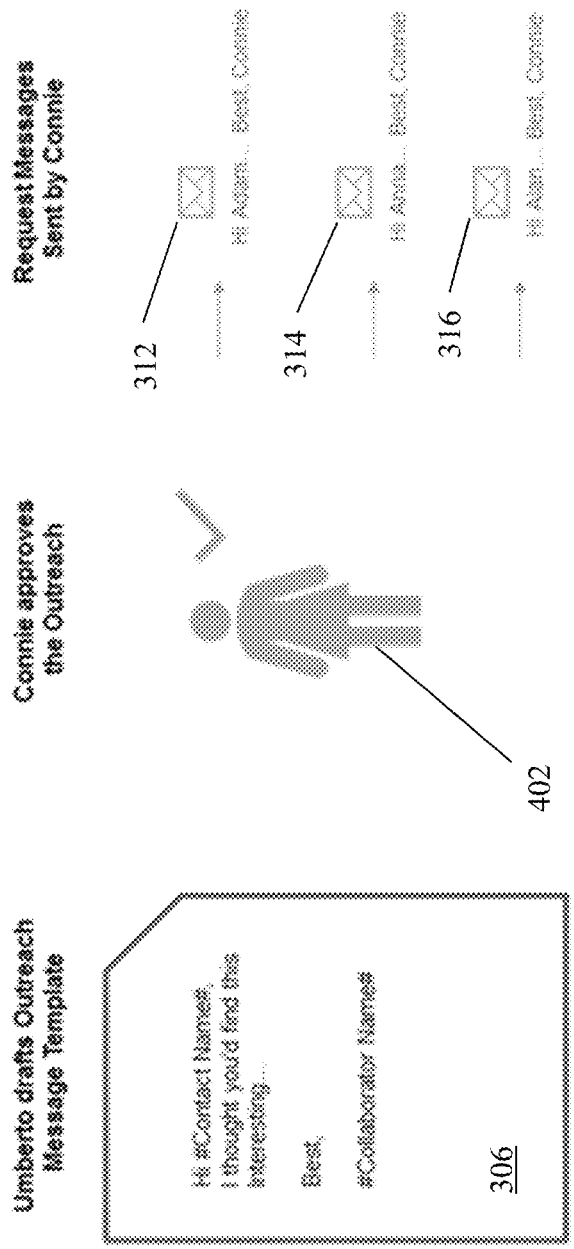
FIG. 4 is an exemplary embodiment of processes suitable for performing embodiments of the present disclosure.

Referring to FIG. 4, in one embodiment, the collaborator 202, 204, 206 (or their application, computer, processor, or device) could draft the outreach message template 306. In this regard, collaborator 202, 204, 206 would not receive the outreach message template 306 from user Umberto 100, but would only receive the campaign directive subset 304 from user Umberto 100. In another embodiment, the user can draft the outreach message template 306 with referencing fields (e.g., #Contact Name # as shown in FIGS. 3 and 4) and include a link or attachment to it in the request message template 200. In this embodiment, the collaborator 202, 204, 206 simply would approve the outreach message template 306 before it is populated (or auto-populated by the collaborator's application, computer, processor, device, etc.) based on the campaign directive information (e.g., the campaign directive subset 304) and sent to the contacts.

As shown in FIG. 4, user Umberto 100 drafts the outreach message template 306. The outreach message template 306 along with the campaign directive subset 304 is sent to user Connie 402. User Connie 402 does not need to create individual messages to contacts 208, but simply needs to approve the outreach message template 306. Once user Connie 402 approves the outreach message template 306, user Connie's 400 computer, application, or device automatically populates the outreach message template 306 with the information from campaign directive subset 304. Next, user Connie's 400 computer, application or device sends the now populated message 312, 314, 316 to contacts 208.

Figure 5:
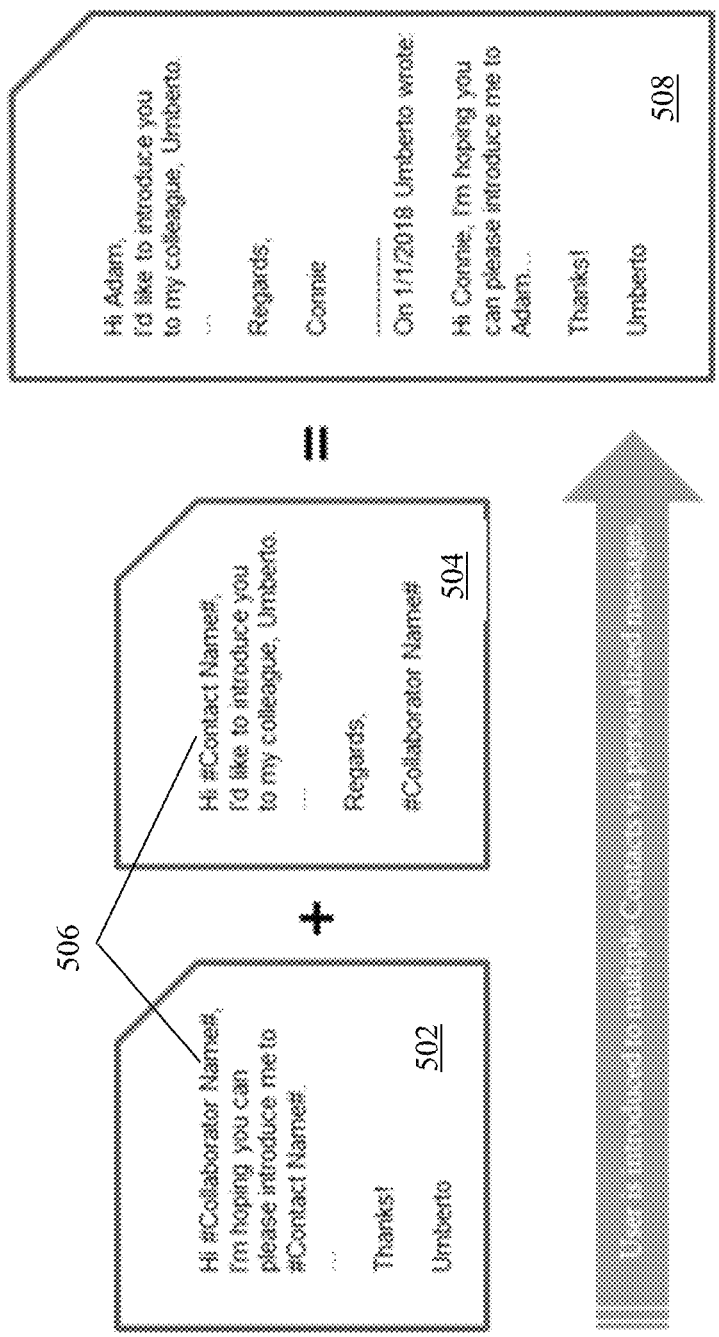
FIG. 5 is an exemplary alternative embodiment of a process suitable for performing embodiments of the present disclosure.

Referring to FIG. 5, shown is the user prepared request message template 502 and optional outreach message template 504 that both include reference fields 506 to a campaign directive or campaign directive subset. In this embodiment, the message 508 sent to the contact 208, 210, 212 simulates the user sending a personalized introduction request to a collaborator or $1^{st}$ degree connection and the collaborator or $1^{st}$ degree connection forwarding the request with a personalized cover note to the contact or $2^{nd}$ degree connection the user requested an introduction to. In this embodiment, a user drafts the outreach message template 504 and the request message template 502. The outreach message template 504, the request message template 502 and the campaign directive subset 304 are sent to the user's collaborators. It should be appreciated that the user may have a plurality of collaborators who will each receive an outreach message template 504, the request message template 502 and a different campaign directive subset 304 based on the $2^{nd}$ degree connections that specific collaborator will message. Each collaborator will then be able to review and approve both the outreach message template 504, the request message template 502 and will be able to review the individuals or companies identified in the campaign directive subset 304. Once approved by the collaborator, the outreach message template 504 and the request message template 502 will automatically populate based on the information in the campaign directive subset 304. The outreach message and the request message will then be combined as shown in FIG. 5 and sent to the specific contact from the collaborator.

Figure 6:
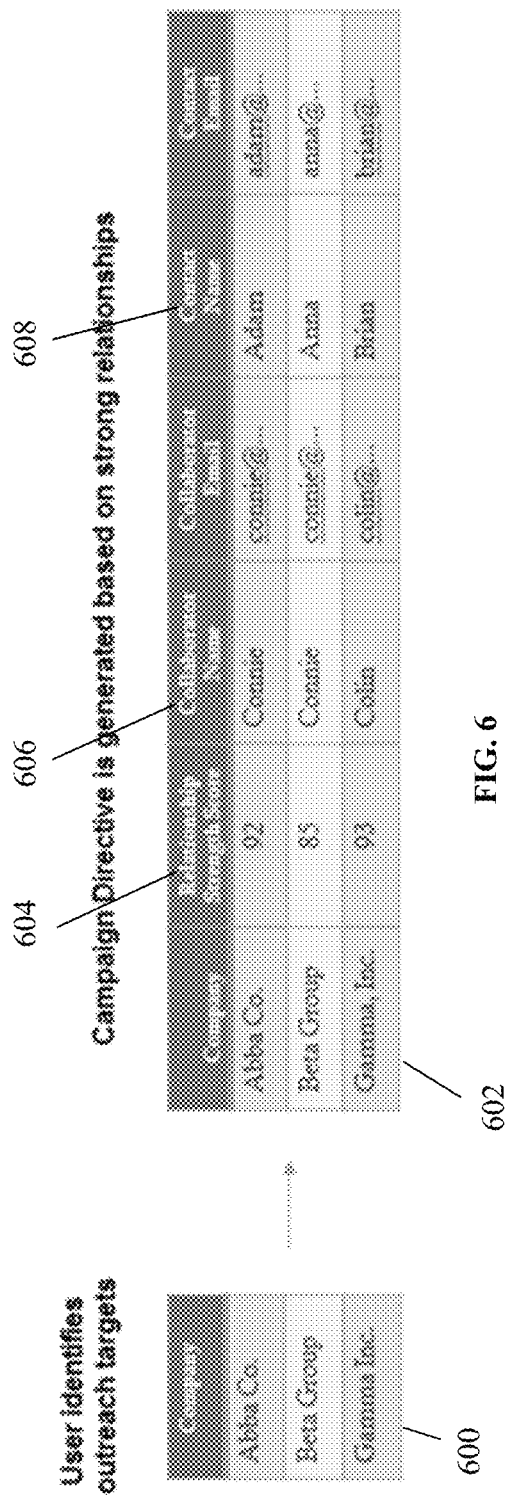
FIG. 6 is yet another exemplary embodiment of processes suitable for performing embodiments of the present disclosure.

Referring to FIG. 6, embodiments of the present disclosure provide that a user can have a list of leads analyzed to determine which $1^{st}$ degree connections of the user should send a message (e.g., introduction message, sales message, advertisement, etc.) to the individuals or companies in the list of leads based on a determined relationship strength between the $1^{st}$ degree connection and a particular lead. In other words, embodiments include a list of leads being analyzed such that the system identifies or determines the collaborator (i.e., $1^{st}$ degree connection of the user) with a correspondence or the strongest relationship to a given contact in the list of leads. Embodiments of a list of leads can include a list of individuals, their contact information, and the company or organization with which they are associated. The strength of a relationship can be based on whether the collaborator and the contact hold senior roles, whether they have communicated often and/or recently, whether they have met often and/or recently, whether they are social media connections, and/or whether they are former colleagues at the same organization, company and/or school. Embodiments include the strength of the relationship being expressed in a relative score or number.

In practice, the system then determines which collaborators (i.e., $1^{st}$ degree connections) of a user should receive particular campaign directives (i.e., subset lists of leads) based on the determined relationship strength. The determined relationship strength can be represented by an absolute or relative number or score. In another embodiment, a list of leads can be a list of companies or organizations. In this embodiment, the system determines which collaborators of a user should receive particular campaign directives (i.e., subset lists of leads) based on whether the collaborator has a relationship with individuals at a particular company or organization and on the determined relationship strength of such individual. The determining can be based on publicly available information, privately available information, emails, messages, and information from social networks. In one embodiment, the system is operable such that the user can override the determined collaborators of the user that receive particular campaign directives.

Embodiments of the present disclosure involve the following process. A user has a list of leads (e.g., names of contacts and contact information on a spreadsheet, names of companies or organizations). The user uses an application on a device to analyze the list of leads to determine which collaborators or $1^{st}$ degree connections have the strongest relationship with each individual or company on the list of leads. The list of leads is then divided into subset lists based on the determined relationship strength. Each subset list of leads is associated with a $1^{st}$ degree connection or collaborator of the user such that each lead is assigned to the collaborator having the strongest relationship with that particular lead, individual or company. The user (through the application) sends each collaborator a subset list of leads with a request for an introduction (e.g., Hi John Doe, can you introduce me to the people listed in the subset list of leads?). Embodiments include the user sending each collaborator a subset list of leads with a message other than a request for an introduction. In one embodiment, the user sends the collaborators a simple accept or decline button in the application to indicate whether they agree or disagree with having a message automatically sent to the leads. Each collaborator will then send a second set of messages to each person or company listed in the subset list of leads making the introduction to the user.

Shown in FIG. 6 is a list of targets (or leads) 600 which lists the companies that the user wants to contact or be introduced to. The system then determines which collaborators of the user have the strongest relationship. As shown in block 602, each company from the list of targets 600 has been associated with a relationship strength score 604 and a collaborator 606 that will send a message to a particular contact 608 at the company. For instance, Connie has a relationship score of 92 for the Company Abba Co. and will send a message (e.g., an introduction to the user) to Adam. Likewise, Colin has a relationship strength score of 93 for the Company Gamma, Inc. and will send a message to Brian.

Figure 7:
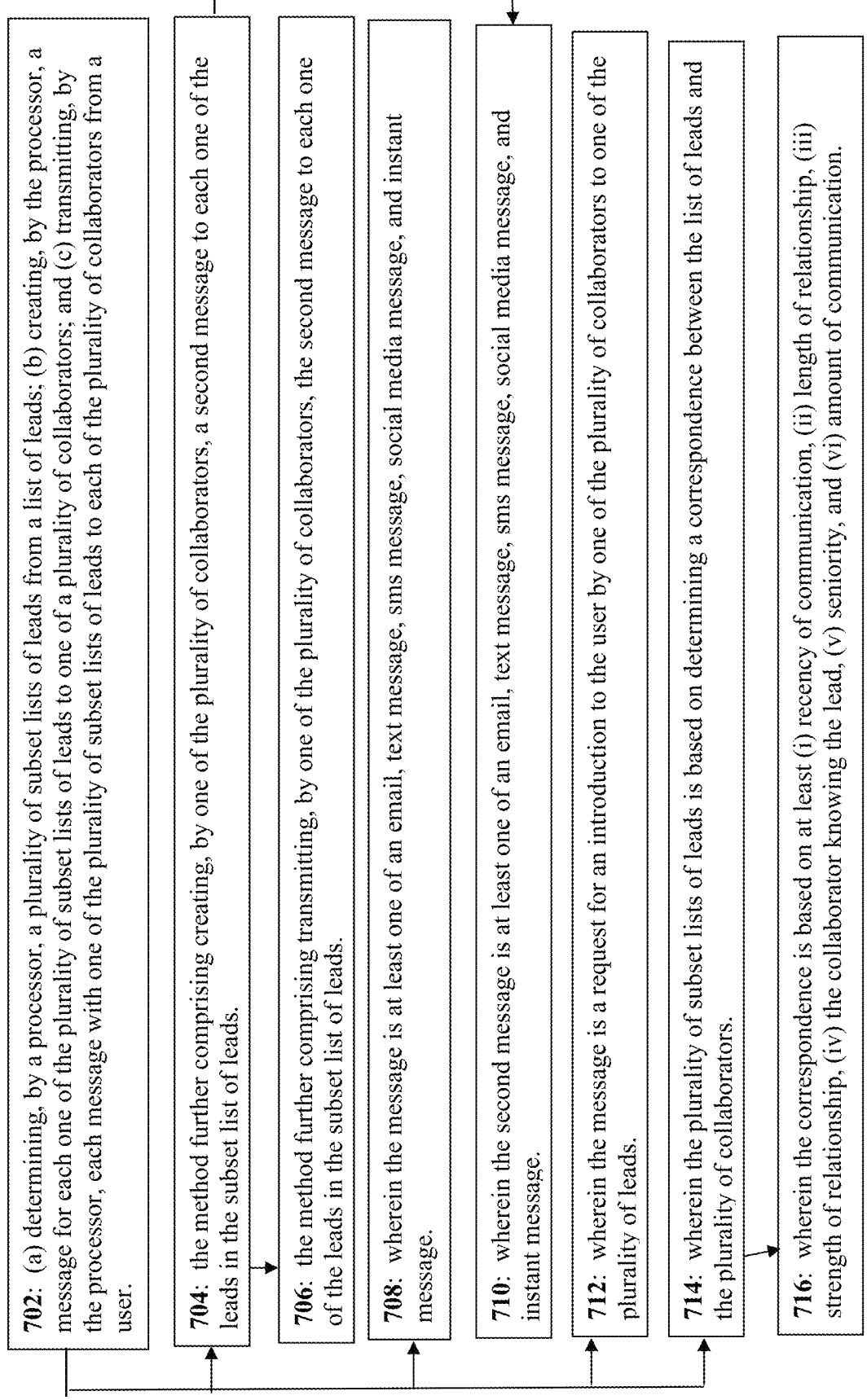
FIG. 7 is an exemplary logic flow diagram suitable for performing embodiments of the present disclosure.

FIG. 7 presents a summary of the above teachings for leveraging connections. Block 702 presents (a) determining, by a processor, a plurality of subset lists of leads from a list of leads; (b) creating, by the processor, a message for each one of the plurality of subset lists of leads to one of a plurality of collaborators; and (c) transmitting, by the processor, each message with one of the plurality of subset lists of leads to each of the plurality of collaborators from a user. Then block 704 states the method further comprising creating, by one of the plurality of collaborators, a second message to each one of the leads in the subset list of leads.

Some of the non-limiting implementations detailed above are also summarized at FIG. 7 following block 704. Block 706 specifies the method further comprising transmitting, by one of the plurality of collaborators, the second message to each one of the leads in the subset list of leads. Block 708 relates to wherein the message is at least one of an email, text message, sms message, social media message, and instant message. Block 710 states wherein the second message is at least one of an email, text message, sms message, social media message, and instant message. Block 712 indicates wherein the message is a request for an introduction to the user by one of the plurality of collaborators to one of the plurality of leads. Then block 714 specifies wherein the plurality of subset lists of leads is based on determining a correspondence between the list of leads and the plurality of collaborators. Block 716 then states wherein the correspondence is based on at least (i) recency of communication, (ii) length of relationship, (iii) strength of relationship, (iv) the collaborator knowing the lead, (v) seniority, and (vi) amount of communication.

The logic diagram of FIG. 7 may be considered to illustrate the operation of a method, or a result of execution of computer program instructions stored in a computer-readable medium. The logic diagram of FIG. 7 may also be considered a specific manner in which components of a device are configured to cause that device to operate, which such a device is a computer, desktop, laptop, mobile phone, smart phone, tablet, server or other electronic device, or one or more components thereof. The various blocks shown in FIG. 7 may also be considered as a plurality of coupled logic circuit elements constructed to carry out the associate functions, or specific result of strings of computer program instructions or code stored in memory.

Various embodiments of the computer-readable medium include any storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, microprocessors digital signal processors and multi-core processors.

Figure 8:
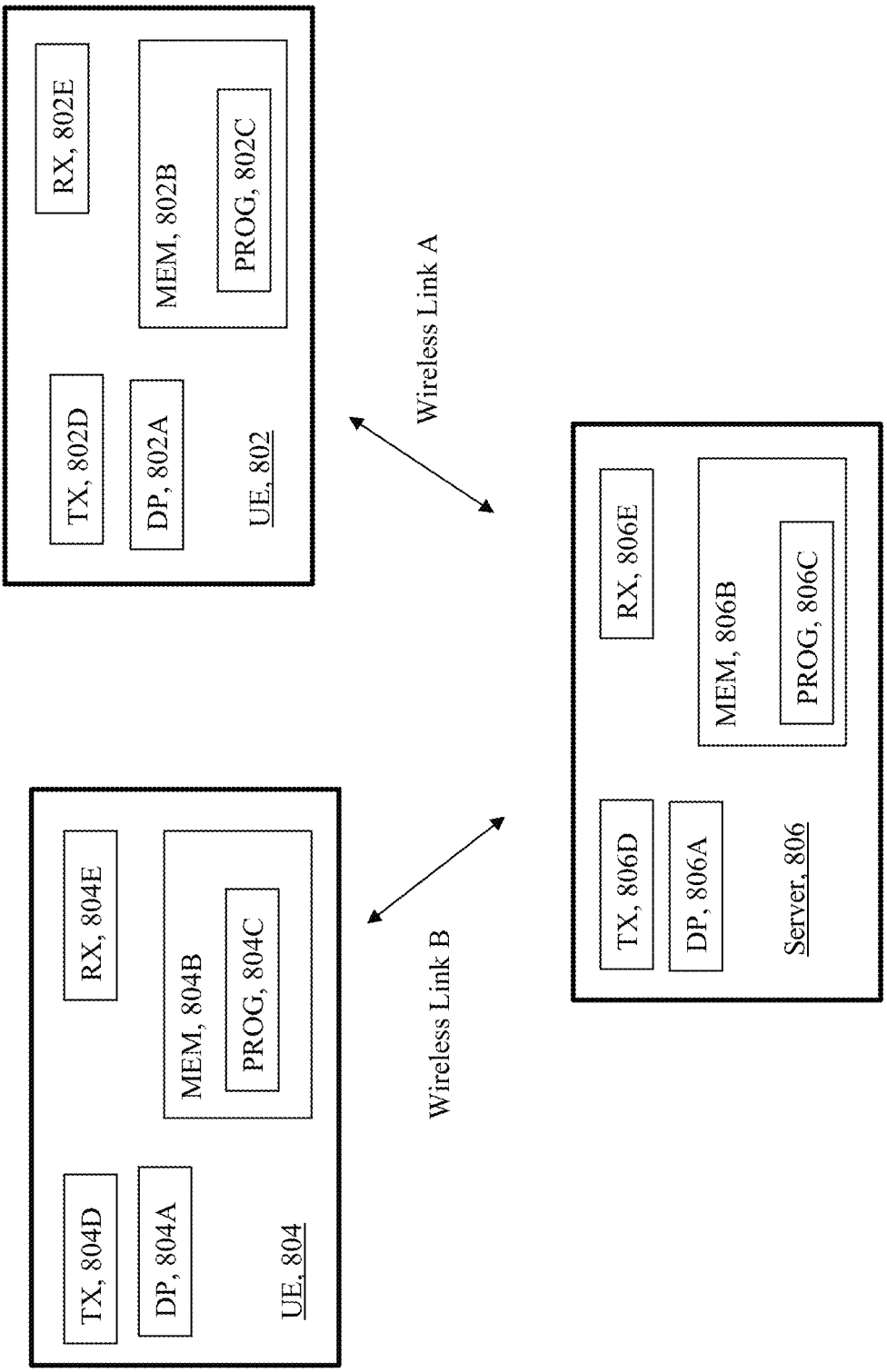
FIG. 8 is a simplified block diagram suitable for performing embodiments of the present disclosure.

Reference is now made to FIG. 8 for illustrating a simplified block diagram of the various electronic devices and apparatus that are suitable for use in practicing exemplary embodiments of this disclosure. Shown in FIG. 8 is server 806 adapted for communication over wireless link A with user equipment (UE) 802. Similarly, server 806 is adapted for communication over wireless link B with UE 804. In other embodiments, server 806 can communicate with UE 802 and UE 804 through wired connections, wireless connections, or a combination of both. Server 806 may include a single server or a plurality of servers.

UE 802 includes processing means such as a processing system and/or at least one data processor (DP) 802A, storing means such as at least one computer-readable medium or computer-readable memory (MEM) 802B storing at least one computer program (PROG) 802C, and also communicating means such as a transmitter (TX) 802D and receiver (RX) 802E for bidirectional wireless communications with server 806 and/or UE 804 and/or any other UE's (not shown).

Server 806 includes processing means such as a processing system and/or at least one data processor (DP) 806A, storing means such as at least one computer-readable memory (MEM) 806B storing at least one computer program (PROG) 806C, and communicating means such as a transmitter (TX) 806D and a receiver (RX) 806E for bidirectional wireless communications with other devices as known in the art.

UE 804 includes processing means such as processing system and/or at least one data processor (DP) 804A, storing means such as at least one computer-readable memory (MEM) 804B storing at least one computer program (PROG) 804C, and communicating means such as a transmitter (TX) 804D and a receiver (RX) 804E for bidirectional wireless communications with other devices. While FIG. 8 only depicts a single UE 804, it should be appreciated that UE 804 can be representative of a plurality of UEs.

Various embodiments of UE 802 and UE 804 can include, but are not limited to desktop computers, laptop computers, tablets, smart phones, smart watches, wearables, and personal portable digital devices. At least one of the PROGs 802C or 804C in UE 802 or UE 804 is assumed to include program instructions that, when executed by the associated DP 802A, 804A, enable the device to operate in accordance with embodiments of the present disclosure, as detailed above. Server 806 may also have software stored in its MEM 806B to implement certain aspects of these teachings. In this regard, embodiments of this disclosure may be implemented at least in part by computer software stored in the MEM 802B, 804B. 806B which is executable by DP 802A of UE 802, DP 804A of UE 804, and/or DP 806A of server 806, or by hardware, or by a combination of tangibly stored software and hardware (and tangibly stored firmware). Electronic devices implementing these aspects of the disclosure need not be the entire devices as depicted at FIG. 8, but embodiments may be implemented by one or more components of same such as the above described tangibly stored software, hardware, firmware and DP, or a system on a chip SOC, an application specific integrated circuit ASIC or a digital signal processor DSP.

Various embodiments of the computer readable MEMs 802B, 804B, and 806B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 802A, 804A and 806A include but are not limited to general purpose computers, special purpose computers, microprocessors, digital signal processors (DSPs) and multi-core processors.

In practice, UE 802 in combination with UE 804 and server 806 are operable to perform embodiments of this disclosure. For instance, the user of UE 802 may want to message or contact its $2^{nd}$ degree connections. Accordingly, UE 802 will prepare a list of contacts to be contacted. UE 802 will analyze the list of contacts and will determine which $1^{st}$ degree connections should message the each one of the contacts from the list of contacts based on the relationship strength between the $1^{st}$ degree connections and each of the contacts. The UE 802 will then send each $1^{st}$ degree connection (in this case UE 804) a subset list of the contacts based on the determined relationship strength. The subset list of contacts along with a request to send a message (or introduction request) is sent from UE 802 to server 806 and then to UE 804. It should be appreciated that server 806 may be representative of the internet or a local network. Then the users of UE 804 can accept the message (or introduction request) and will send messages to the contacts to which they were assigned. It should be appreciated that the server 806 may perform the analyzing, determining, and sending steps in this process.

Reference is now made to FIG. 9, which presents a logic flow diagram in accordance with the above teachings. Block 902 presents (a) analyzing, by a processor, a plurality of collaborators of a user and a plurality of leads; (b) determining, by the processor, a correspondence between (i) each one of the plurality of collaborators, and (ii) the plurality of leads; (c) transmitting, by the processor, messages to the plurality of collaborators; and (d) creating, by the processor, a second message to each one of the subset of the plurality of leads from one of the plurality of collaborators. Next block 904 states wherein the plurality of leads is one of a list and a spreadsheet of individuals.

Following block 904, block 906 specifies wherein the correspondence is based on at least (i) recency of communication, (ii) length of relationship, (iii) strength of relationship, (iv) seniority, and (v) amount of communication. Block 908 relates to wherein the correspondence is based on the collaborator knowing the lead. Block 910 states wherein the second message is at least one of an email, text message, sms message, social media message, and instant message. Block 912 specifies wherein the message is a request for an introduction to the user by one of the plurality of collaborators to one of the plurality of leads. Finally block 914 states wherein the user is one of the plurality of collaborators.

The logic diagram of FIG. 9 may be considered to illustrate the operation of a method, or a result of execution of computer program instructions stored in a computer-readable medium. The logic diagram of FIG. 9 may also be considered a specific manner in which components of a device are configured to cause that device to operate, which such a device is a computer, desktop, laptop, mobile phone, smart phone, tablet, server or other electronic device, or one or more components thereof.

This disclosure has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of leveraging connections, the method comprising:
   (a) determining, by a processor, a plurality of subset lists of leads from a list of leads, wherein the plurality of subset lists of leads is based on determining a correspondence between the list of leads and a plurality of collaborators of a user, and wherein each one of the plurality of subset lists of leads do not have a correspondence to the user;
   (b) creating, by the processor, a message for each one of the plurality of subset lists of leads to one of a plurality of collaborators, wherein the message is from the user to one of the plurality of collaborators requesting an introduction to one of the plurality of subset lists of leads;
   (c) transmitting, by the processor, each message with one of the plurality of subset lists of leads to each of the plurality of collaborators from a user;
   (d) automatically creating, by a plurality of user equipments each associated with the plurality of collaborators, a plurality of second messages to each one of the leads in the subset list of leads, wherein each one of the plurality of second messages is associated with one of the leads in the subset list of leads is based on the determined correspondence, and wherein the plurality of second messages comprise an introduction of one of the leads in the subset list of leads with the user; and
   (e) transmitting, by the plurality of user equipments associated with the plurality of collaborators, the plurality of second messages to each one of the leads in the subset list of leads.

2. The method according to claim 1, wherein the message is at least one of an email, text message, sms message, social media message, and instant message.

3. The method according to claim 1, wherein the second message is at least one of an email, text message, sms message, social media message, and instant message.

4. The method according to claim 1, wherein the correspondence is based on at least (i) recency of communication, (ii) length of relationship, (iii) strength of relationship, (iv) the collaborator knowing the lead, (v) seniority, and (vi) amount of communication.

5. The method according to claim 1, the method further comprising tracking responses to the introduction request messages and to the second messages.

6. The method according to claim 1, wherein the correspondence is based on the collaborator knowing the lead.

7. A method of leveraging connections, the method comprising:
(a) analyzing, by a processor, a plurality of collaborators of a user and a plurality of leads;
(b) determining, by the processor, a subset of the plurality of leads that have a correspondence between (i) each one of the plurality of collaborators, and (ii) the plurality of leads, wherein each one of the subset of plurality of leads do not have a correspondence to the user;
(c) transmitting, by the processor, messages to the plurality of collaborators, wherein the message is from the user to one of the plurality of collaborators requesting an introduction to one of the plurality of subset lists of leads;
(d) automatically creating, by plurality of processors each associated with the plurality of collaborators, a plurality of second messages to each one of the subset of the plurality of leads from one of the plurality of collaborators, wherein each one of the plurality of second messages is associated with one of the leads in the subset list of leads is based on the determined correspondence, and wherein the plurality of second messages comprise an introduction of one of the leads in the subset list of leads with the user; and
(e) transmitting, by the plurality of processors each associated with the plurality of collaborators, the plurality of second messages to each one of the leads in the subset of the plurality of leads.

8. The method according to claim 7, wherein the plurality of leads is one of a list and a spreadsheet of individuals.

9. The method according to claim 7, wherein the correspondence is based on at least (i) recency of communication, (ii) length of relationship, (iii) strength of relationship, (iv) seniority, and (v) amount of communication.

10. The method according to claim 7, wherein the correspondence is based on the collaborator knowing the lead.

11. The method according to claim 7, wherein the second message is at least one of an email, text message, sms message, social media message, and instant message.

12. The method according to claim 7, wherein the user is one of the plurality of collaborators.

\* \* \* \* \*